United States Patent
Schuster

(10) Patent No.: US 8,844,411 B2
(45) Date of Patent: Sep. 30, 2014

(54) APPARATUS FOR MACHINING SHAFT-SHAPED WORKPIECES

(71) Applicant: Markus Schuster, Fuchstal-Leeder (DE)

(72) Inventor: Markus Schuster, Fuchstal-Leeder (DE)

(73) Assignee: Emag Holding GmbH, Salach (DE)

( * ) Notice: Subject to any disclaimer, the term of this patent is extended or adjusted under 35 U.S.C. 154(b) by 145 days.

(21) Appl. No.: 13/688,375

(22) Filed: Nov. 29, 2012

(65) Prior Publication Data
US 2013/0133488 A1 May 30, 2013

(30) Foreign Application Priority Data
Nov. 30, 2011 (DE) .......................... 10 2011 119 787

(51) Int. Cl.
| | |
|---|---|
| B23B 3/06 | (2006.01) |
| B23B 3/30 | (2006.01) |
| B23Q 39/02 | (2006.01) |
| B23Q 1/01 | (2006.01) |
| B23B 3/16 | (2006.01) |
| B23Q 39/00 | (2006.01) |

(52) U.S. Cl.
CPC ............... *B23B 3/30* (2013.01); *B23Q 39/028* (2013.01); *B23Q 1/017* (2013.01); *B23Q 2039/008* (2013.01); *B23Q 2039/004* (2013.01)
USPC .............................................. 82/122; 82/121

(58) Field of Classification Search
CPC .... B23Q 7/047; B23Q 11/0053; B23Q 39/00; B23Q 11/08
USPC ............................ 82/121, 122, 124, 125, 129
See application file for complete search history.

(56) References Cited

U.S. PATENT DOCUMENTS

| | | | | |
|---|---|---|---|---|
| 4,742,739 | A * | 5/1988 | Yamaguchi et al. | ............ 82/122 |
| 6,021,695 | A * | 2/2000 | Kosho et al. | ..................... 82/122 |
| 6,904,665 | B2 * | 6/2005 | Walz | ............................... 29/563 |
| 8,661,950 | B2 * | 3/2014 | Hessbrueggen et al. | ....... 82/1.11 |

* cited by examiner

*Primary Examiner* — Will Fridie, Jr.
(74) *Attorney, Agent, or Firm* — Andrew Wilford

(57) ABSTRACT

A machining apparatus for a shaft-type workpiece has a housing or frame defining a pair of spaced and upright side walls and a vertical front wall bridging the side walls. Vertical guides on one of the side walls carry a vertically shiftable headstock and tailstock capable of rotating a workpiece about an upright axis. Horizontal guides on the front wall carry a turret adapted to hold first machining tools and horizontally shiftable for engagement of the first tools with a workpiece held and rotated by the headstock and tailstock. A holder on the other of the side walls can hold a workpiece with an end of the workpiece exposed so that a second tool can engage and machine the exposed end of the workpiece.

7 Claims, 2 Drawing Sheets

APPARATUS FOR MACHINING SHAFT-SHAPED WORKPIECES

FIELD OF THE INVENTION

The present invention relates to a machining apparatus. More particularly this invention concerns such an apparatus for machining a shaft-shaped workpiece.

BACKGROUND OF THE INVENTION

A machine with a plurality of successive machining stations is known from U.S. Pat. No. 6,904,665. Tool turrets each having a grab are mounted to the left and right of each of two machining stations. The tool turrets are movable so that the machining and the gripping of the workpieces can take place in a machining station by tools and grabs of both tool turrets. Three tool turrets are required for a machining apparatus operating according to this principle with two machining stations for "complete" machining, meaning not only machining outer surfaces of a rod-shaped workpiece centered on an axis by rotating the workpiece, lathe fashion, while pressing tools—cutting bits, grinding stones, burnishers—against its outer surface but also machining ends of the workpiece, for instance boring an axial hole in the workpiece end. The end machining is done by setting one end of the workpiece in a rotatable chuck or the like so the other end is clear and can be worked on.

OBJECTS OF THE INVENTION

It is therefore an object of the present invention to provide an improved apparatus for machining shaft-shaped workpieces.

Another object is the provision of such an improved apparatus for machining shaft-shaped workpieces that overcomes the above-given disadvantages, in particular that has two stations, one for machining side surfaces and one for machining an end surface of a shaft-shaped workpiece, that is a normally elongated workpiece centered on an axis.

SUMMARY OF THE INVENTION

A machining apparatus for a shaft-type workpiece has according to the invention a housing or frame defining a pair of spaced and upright side walls and a vertical front wall bridging the side walls. Vertical guides on one of the side walls carry a vertically shiftable headstock and tailstock capable of rotating a workpiece about an upright axis. Horizontal guides on the front wall carry a turret adapted to hold first machining tools and horizontally shiftable for engagement of the first tools with a workpiece held and rotated by the headstock and tailstock. A holder on the other of the side walls can hold a workpiece with an end of the workpiece exposed so that a second tool can engage and machine the exposed end of the workpiece.

The holder according to the invention is a spindle capable of gripping the end of the workpiece not is machined, and the second tool also is carried on the turret. It can pickup, rotate, and set down the workpiece.

The holder can also comprise a lower tailstock fixed on the other side wall, an upper headstock vertically movable on the other side wall, and a steady rest on the other side wall engageable with a side of the workpiece and lying between the tailstock and headstock of the other side wall. This steady rest can be vertically shiftable on the other side wall.

The machining apparatus further has according to the invention a conveyor for transporting the workpiece to and away from a position adjacent the other side wall and aligned with the headstock and tailstock thereof.

The machining apparatus further has according to the invention two respective grabs for aligning workpieces with the headstocks on the side walls.

BRIEF DESCRIPTION OF THE DRAWING

The above and other objects, features, and advantages will become more readily apparent from the following description, reference being made to the accompanying drawing in which.

DETAILED DESCRIPTION

Figure 1:
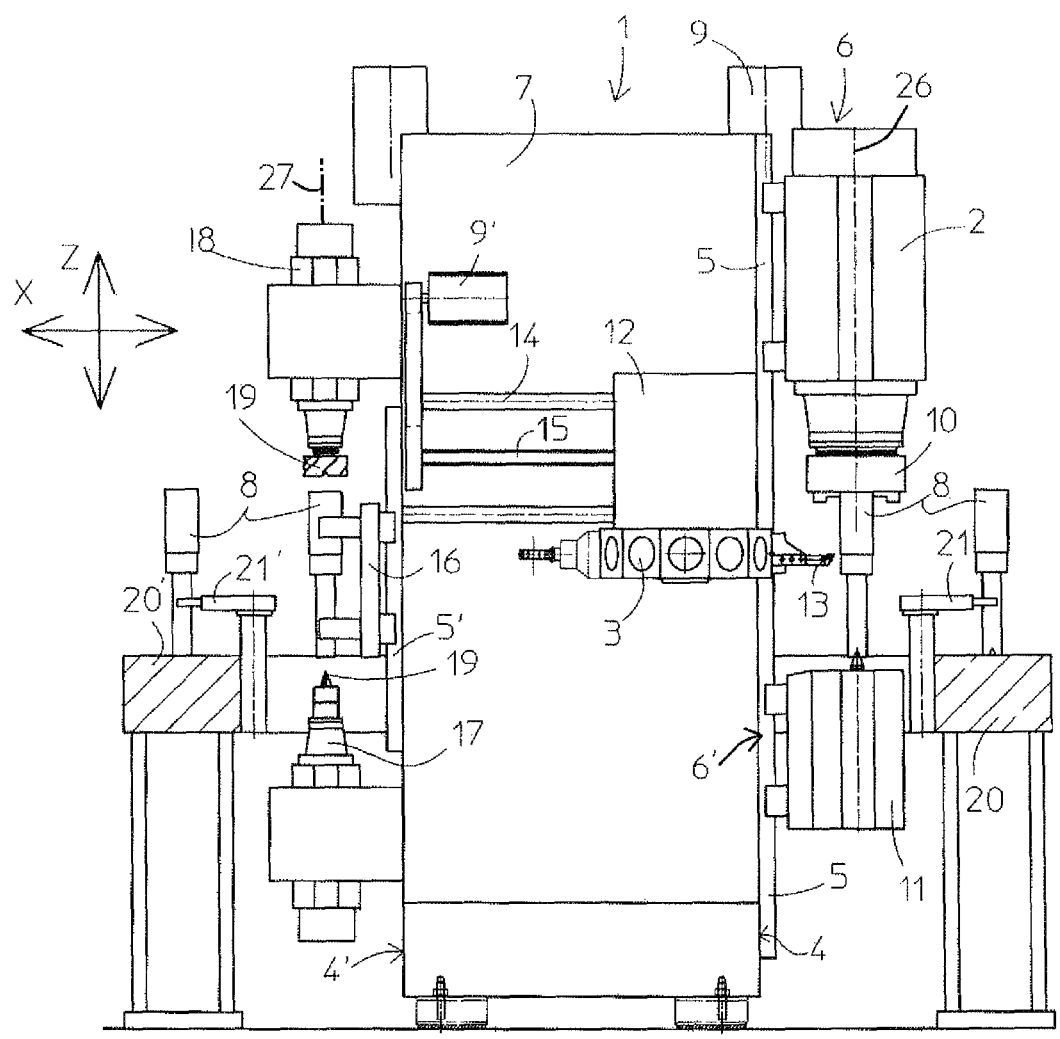
FIG. 1 is small-scale front elevational view of a machining apparatus according to the invention.

As seen in FIG. 1, a machining apparatus has a columnar frame 1 with two vertical and parallel side walls 4 and 4' perpendicular to the view plane of FIG. 1 and a front wall 7 perpendicularly bridging the side walls 4 and 4' and parallel to the view plane. Conveyors 20 and 20', typically of the belt type, are juxtaposed with the walls 4 and 4' and can bring unmachined workpieces 8 up to the front of the machine and carry machined workpieces 8' (FIG. 2) away.

An upper carriage 6 is slidable in vertical guides 5 on the side wall and a lower carriage 6' is slidable below the carnage in the guides 5. The carriage 6 supports a headstock 2 and the carriage 6' a tailstock 11 defining with the headstock 2 a first vertical machining axis 26 parallel to a vertical axis Z. A first loader/unloader 21 can move workpieces 8 from the conveyor 20 to alignment with th axis 25 for rotation by the headstock 2 bout this axis 26.

The other side wall 4' has vertical guide rails 5' that carry a side workpiece holder or steady rest 16 underneath an upper suspended rotatable spindle drive 18 and above a lower spindle 17 defining a second machining axis 27 parallel to the axis Z. Thus a workpiece can be held by the side holder 16 and worked at either end by rotatable tools 19 held by the spindles 17 and 18. An second loader/unloader 21' can move workpieces 8 from the conveyor 20' to alignment with the axis 27 for end machining by either or both of the tools 19.

Horizontal guide rails on the front wall 7 of the housing 1 support a carriage 12 for movement horizontally parallel to a horizontal axis X. The carriage 12 supports a is turret 3 carrying tools 13 that are mainly used to machine the side surfaces of the tool 8 being rotated about the axis 26 by the headstock 2 and tailstock 11. A drive motor 9' can rotate a spindle 15 to adjust the position of the carriage and turret 3 along the axis X. The carriage 2 is cantilevered and the headstock 17 and tailstock 18 are positioned so the axes 26 and 27 are forward of the plane of the front wall 7 and the tools 13 of the turret 3 can be effective on the workpieces 8.

Figure 2:
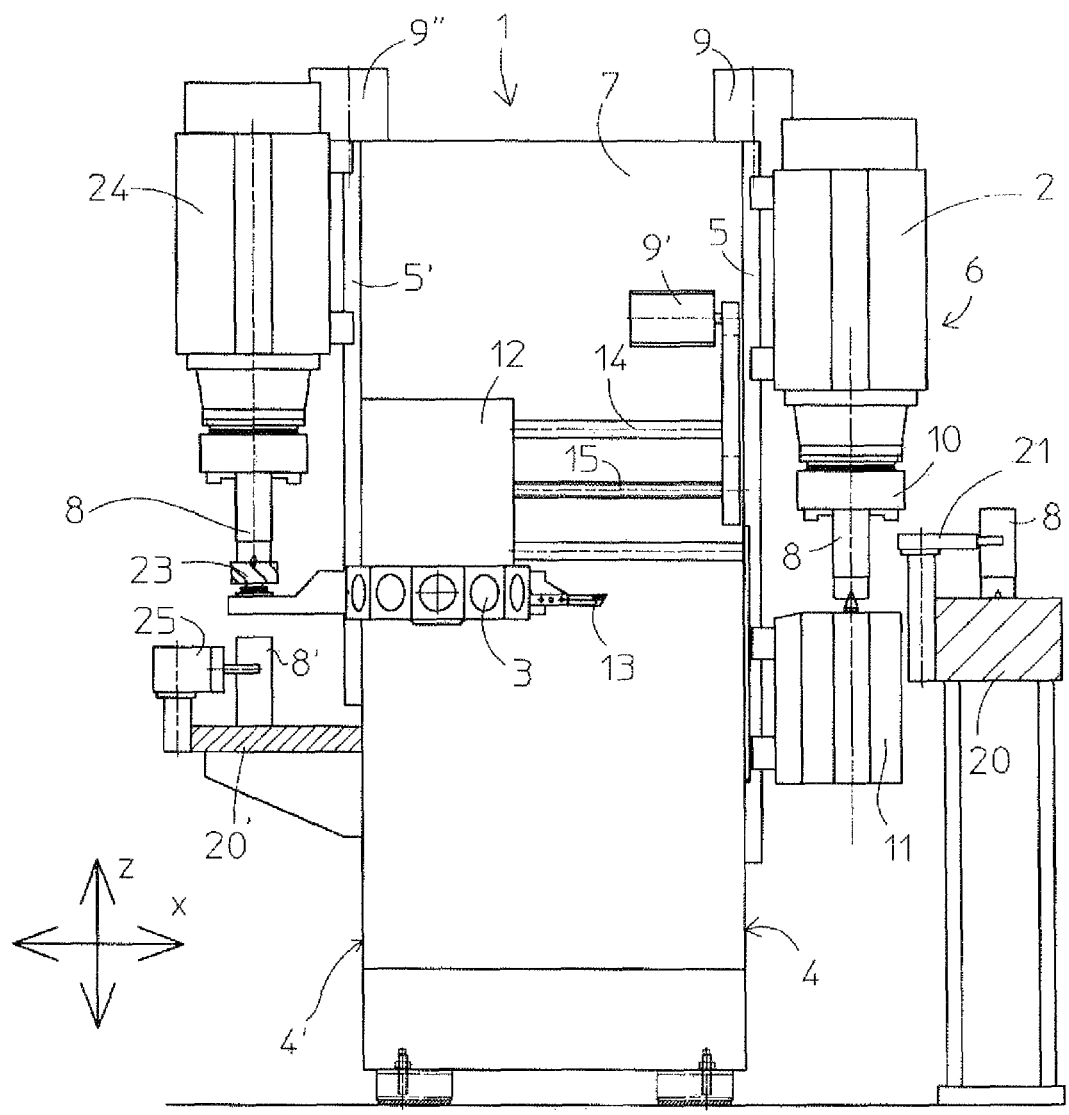
FIG. 2 is a view like FIG. 1 of another such apparatus in accordance with the invention.

In FIG. 2, where the same reference numerals as in FIG. 1 are used for functionally identical elements, the machining station formed by the headstock 2 and 11 is identical to that of FIG. 1. On the wall 4', however, there are vertical rails 5' supporting a vertically displaceable pickup-type second spindle 24 that can be shifted vertically by a drive 9" to act as a workpiece holder and grip the top end of the workpiece 8 for machining its bottom end by the tool 23 carried by the turret 13. Here also a device 24 is provided for turning over the workpiece 8 so that once one end of the workpiece 8 has been machined to turn it into a semifinished workpiece 8', it can be turned over so that its other end can be held by the spindle 24 and its still unmachined end can be worked on by the tool 23.

In both FIGS. 1 and 2 it is possible to machine all side surfaces and both ends of the workpieces 8 by working only three axes.

I claim:

1. A machining apparatus for a shaft-type workpiece, the apparatus comprising:
    a frame defining a pair of spaced and upright side walls and a vertical front wall bridging the side walls;
    vertical guides on one of the side walls;
    a headstock and tailstock vertically shiftable in the vertical guides and capable of rotating a workpiece about an upright axis;
    horizontal guides on the front wall;
    a turret adapted to hold first machining tools horizontally shiftable on the horizontal guides for engagement of the tools with a workpiece held and rotated by the headstock and tailstock;
    a holder on the other of the side walls capable of holding a workpiece with an end of the workpiece exposed; and
    a second tool engageable with the exposed end of the workpiece.

2. The machining apparatus defined in claim 1, wherein the holder is a spindle capable of gripping the end of the workpiece not being machined, and the second tool also being carried on the turret.

3. The machining apparatus defined in claim 1, wherein the holder can pickup, rotate, and set down the workpiece.

4. The machining apparatus defined in claim 1, wherein the holder comprises:
    a lower tailstock fixed on the other side wall;
    an upper headstock vertically movable on the other side wall; and
    a steady rest on the other side wall engageable with a side of the workpiece and lying between the tailstock and headstock of the other side wall.

5. The machining apparatus defined in claim 4, wherein the steady rest is vertically shiftable on the other side wall.

6. The machining apparatus defined in claim 4, further comprising:
    conveyor for transporting the workpiece to and away from a position adjacent the other side wall and aligned with the headstock and tailstock thereof.

7. The machining apparatus defined in claim 4, further comprising two respective grabs for aligning workpieces with the headstocks on the side walls.

* * * * *